(12) United States Patent
Longhurst et al.

(10) Patent No.: US 9,275,605 B2
(45) Date of Patent: Mar. 1, 2016

(54) CONTENT METADATA ENHANCEMENT OF HIGH DYNAMIC RANGE IMAGES

(75) Inventors: Peter W. Longhurst, Vancouver (CA); Lewis Johnson, Delta (CA); Neil W. Messmer, Langley (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 329 days.

(21) Appl. No.: 13/885,662

(22) PCT Filed: Nov. 17, 2011

(86) PCT No.: PCT/US2011/061112
§ 371 (c)(1),
(2), (4) Date: May 15, 2013

(87) PCT Pub. No.: WO2012/071235
PCT Pub. Date: May 31, 2012

(65) Prior Publication Data
US 2013/0235072 A1    Sep. 12, 2013

Related U.S. Application Data

(60) Provisional application No. 61/416,728, filed on Nov. 23, 2010.

(51) Int. Cl.
G09G 5/00 (2006.01)
G09G 5/02 (2006.01)
H04N 1/46 (2006.01)
(Continued)

(52) U.S. Cl.
CPC *G09G 5/02* (2013.01); *G06T 5/007* (2013.01); *H04N 1/46* (2013.01); *H04N 1/644* (2013.01); *H04N 19/184* (2014.11); *H04N 19/30* (2014.11);
(Continued)

(58) Field of Classification Search
CPC . G09G 5/02; G06T 5/007; G06T 2207/20208
See application file for complete search history.

(56) References Cited

U.S. PATENT DOCUMENTS 6,795,053 B1    9/2004  Funamoto
6,829,301 B1   12/2004  Tinker
(Continued)

FOREIGN PATENT DOCUMENTS

EP      2144444      1/2010
JP   2002-132243     1/2008
(Continued)

OTHER PUBLICATIONS

Leonid Levkovich, Maslyuk et al., "Texture Compression with Adaptive Block Partitions" Dec. 2000, pp. 401-403.*
(Continued)

*Primary Examiner* — Jacinta M Crawford
*Assistant Examiner* — Robert Craddock
(74) *Attorney, Agent, or Firm* — John Carpenter

(57) ABSTRACT

Image data is encoded for distribution in a lower bit-depth format. The image data has a range that is less than a maximum range and is mapped to the lower bit depth format using a mapping such that a ratio of a range of the lower bit depth representation to a maximum range of the lower bit depth representation is greater than a ratio of the range of the image data to a maximum range of the image data. Metadata characterizing the mapping is associated with lower bit depth representation. The metadata may be used downstream to reverse the mapping so that tonal detail is better reproduced.

15 Claims, 7 Drawing Sheets

(51) Int. Cl.
- *H04N 1/64* (2006.01)
- *H04N 19/46* (2014.01)
- *H04N 19/184* (2014.01)
- *G06T 5/00* (2006.01)
- *H04N 19/30* (2014.01)
- *H04N 19/85* (2014.01)

(52) U.S. Cl.
CPC ............... *H04N 19/46* (2014.11); *H04N 19/85* (2014.11); *G06T 2207/20208* (2013.01)

(56) References Cited

U.S. PATENT DOCUMENTS

| | | |
|---|---|---|
| 7,142,712 B2 | 11/2006 | Maruoka |
| 7,199,840 B2 | 4/2007 | Shiota |
| 2006/0221046 A1 | 10/2006 | Sato |
| 2007/0216972 A1 | 9/2007 | Hsieh |
| 2007/0268242 A1 | 11/2007 | Baba |
| 2007/0291179 A1 | 12/2007 | Sterling |
| 2008/0018506 A1 | 1/2008 | Raveendran |
| 2008/0043153 A1 | 2/2008 | Cha |
| 2009/0226152 A1 | 9/2009 | Hanes |
| 2010/0085374 A1 | 4/2010 | Lee |
| 2010/0103090 A1 | 4/2010 | Baek |
| 2010/0157078 A1* | 6/2010 | Atanassov et al. ......... 348/222.1 |
| 2010/0201719 A1 | 8/2010 | Kimura |

FOREIGN PATENT DOCUMENTS

| | | |
|---|---|---|
| KR | 10-2007-0017717 | 2/2007 |
| WO | 99/37096 | 7/1999 |

OTHER PUBLICATIONS

Kondo, T. et al "Adaptive Dynamic Range Coding Scheme for Future Consumer Digital VTR" International Conference on Video, Audio and Data Recording, vol. 79, Jan. 1, 1988, pp. 219-226.

Chen, M. et al "JPEG Compatible Coding of High Dynamic Range Imagery Using Tone Mapping Operators" Picture Coding Symposium, Apr. 24-26, 2006.

* cited by examiner

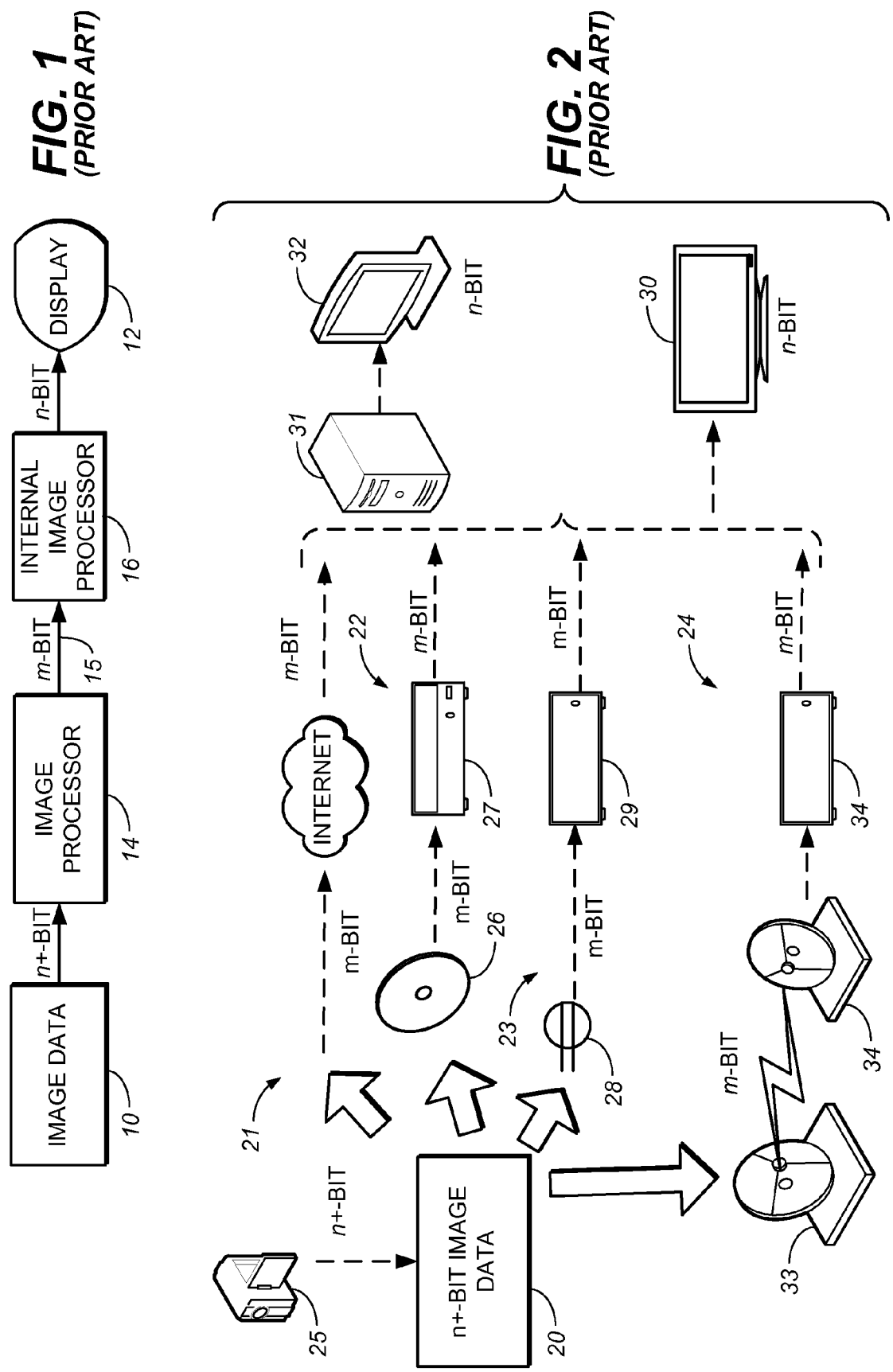

CONTENT METADATA ENHANCEMENT OF HIGH DYNAMIC RANGE IMAGES

CROSS-REFERENCE TO RELATED APPLICATIONS

This application claims priority to U.S. Provisional Patent Application No. 61/416,728 filed 23 Nov. 2010, hereby incorporated by reference in its entirety.

TECHNICAL FIELD

This disclosure addresses reduction of undesirable visually perceptible artifacts when an image encoded with a bit depth m is displayed on a display having a bit depth n, where m<n. Metadata distributed with the image characterizes the image's luminance range.

BACKGROUND

A display's bit depth corresponds to the number of levels of brightness that each of the display's pixels can reproduce or display. Higher bit depth displays can reproduce more discrete levels of brightness. For example, a display having a bit depth of 1 may represent either one of $2^1=2$ levels of brightness in each pixel (e.g. each pixel can be ON or OFF). By contrast, in a display having a bit depth of 10, the display may be able to control each pixel to have one of $2^{10}=1024$ distinct levels of brightness.

A color display may provide separate sub-pixels for each of a number of primary colors. For example, a display may provide pixels comprising sub-pixels that are red, green and blue. The luminance and color of a pixel can be controlled by varying the brightness of each sub-pixel. Greater bit-depth in the control of sub-pixels permits more discrete levels of luminance to be represented and also permits a color display to display a larger numbers of different colors. With a bit-depth of one for each sub-pixel one sub-pixel can be black or red, another sub-pixel can be black or green, and the third sub-pixel can be black or blue. In this case, the pixel may represent any of $2^1 \times 2^1 \times 2^1 = 2^3 = 8$ colors.

A color display having a bit depth of 8 is capable of representing any one of $2^8=256$ levels of brightness in each displayed sub-pixel. For example, a value of 0 may represent a value at the bottom of the sub-pixel's luminance range (typically black) and a value of 255 may represent a value at the top of the sub-pixel's luminance range. Such a display can theoretically display any one of $2^8 \cdot 2^8 \cdot 2^8 = 2^{24} = 16,777,216$ colors in each pixel.

To facilitate their display, images are encoded using various coding schemes. Bit depth is an attribute of such schemes. If an image is encoded using a bit depth of 8 then each one of the encoded image's sub-pixels (or pixels in the case of a monochrome image) may represent any one of $2^8=256$ levels of brightness. If the same image is encoded using a bit depth of 10 then each one of the encoded image's sub-pixels (or pixels in the case of a monochrome image) may represent any one of $2^{10}=1,024$ levels of brightness. Thus, a higher bit depth provides a finer granularity within the luminance range of the pixels.

Some encoding schemes for color images do not directly specify brightness of individual sub-pixels. For example, the LUV scheme specifies overall luminance (L) for a pixel and specifies color for the pixel using two chroma coordinate values U and V. Again, a greater bit depth can be used to increase the number of distinct luminance steps and/or colors that can be represented by the image data.

It is generally desirable that the luminance steps in a displayed image be small enough that a luminance difference of one step is not readily perceptible to the human visual system (HVS). Steps larger than this can result in visible artefacts such as banding, particularly in image regions where the luminance is slowly varying. Since higher bit depths make possible finer steps, higher bit depths are desirable for displaying images having higher luminance ranges. However, images encoded with higher bit depths are larger (i.e. consume more computer memory or storage space and more bandwidth on communication links) than images encoded with lower bit depths, and accordingly require increased computational processing time and resources before they can be displayed. Consequently, images are often encoded for distribution at lower than optimum bit depths, notwithstanding the availability of displays having higher bit depth capabilities and the fact that images are often initially acquired at higher bit depths.

There is a need for practical and cost effective methods and apparatus for distributing and reproducing images (both still and video images) having a desired image quality.

SUMMARY OF THE INVENTION

This invention provides methods and apparatus that may be applied in the distribution, processing and display of image data. Aspects of the invention provide: methods for encoding image data in a lower bit depth format for distribution; methods for preparing distributed image data for display and for displaying such distributed image data; apparatus for encoding image data in a lower bit depth representation using a variable mapping; apparatus for processing lower bit depth image data to a higher bit depth using variable mappings; apparatus for displaying distributed image data. The invention may be applied, for example in distribution and display of movies, television programming and other video content. The invention may, for example, be embodied in televisions, video monitors, computer monitors, computer systems, special purpose displays and the like.

One aspect of the invention provides a method for distributing image data. The method comprises determining a range of the image data and mapping the image data to a reduced bit-depth format to produce a lower bit-depth representation of the image data. The mapping is done with a mapping such that a ratio of a range of the lower bit depth representation to a maximum range of the lower bit depth representation is greater than a ratio of the range of the image data to a maximum range of the image data. The method generates metadata characterizing the mapping and associates the metadata with the lower bit depth representation.

Another aspect of the invention provides a method for displaying images. The method comprises obtaining image data in a first format having a first bit depth and corresponding metadata. Based on the metadata the method generates a tone mapping for mapping the image data to a second format having a second bit depth greater than the first bit depth. The method then applies the tone mapping to map the image data to the second format and displays the second format data.

Another aspect of the invention provides image processing apparatus comprising an image analyzer configured to determine a range of values in image data for an image in a first format and to generate a mapping for the image from the first format to a second format having a lower bit depth than the first format. The apparatus comprises a mapping unit configured to map the image from the first format to the second format according to the mapping and an encoding unit configured to encode the second format image data and metadata representing the mapping into a distribution format.

Further aspects of the invention and features of example embodiments of the invention are described below and illustrated in the accompanying drawings.

BRIEF DESCRIPTION OF THE DRAWINGS

The appended drawings illustrate example non-limiting embodiments of the invention.

FIG. 1 is a simplified block diagram depiction of a prior art imaging system in which n+-bit image data is encoded with a bit depth of m-bits and distributed to a display having a bit depth n, where m<n.

FIG. 2 is a simplified schematic depiction of an imaging system in which n+-bit depth image data is distributed over distribution paths having a reduced bit depth. The example distribution paths include cable TV, satellite TV, disc (e.g. a DVD or a Blu-ray™ disc) and internet paths.

DETAILED DESCRIPTION

Figure 3:
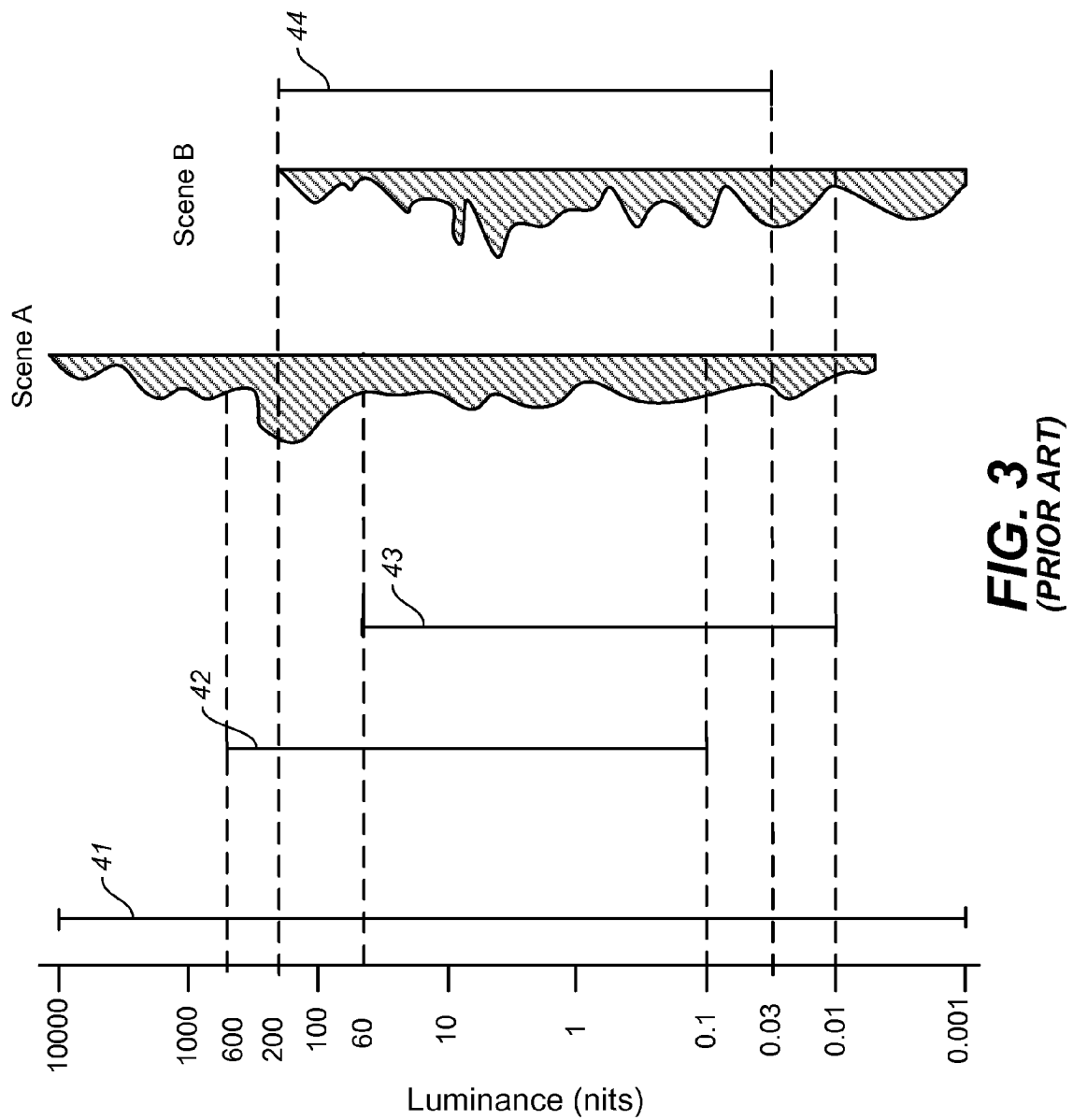
FIG. 3 schematically depicts display of bright and dark images respectively on a dimmable display, in accordance with the prior art.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Background

FIG. 1 illustrates an example case in which image data 10 having a bit depth of at least n-bits (n+-bits) is converted to a lower bit depth of m-bits and encoded for distribution by an image processor 14. m-bit signal 15 is delivered to an image processor 16 (which may, for example, be internal to a display or external to the display). Image processor 16 renders the signal in a bit depth of n-bits for display on display 12.

The bit depth of the image which is to be displayed can in practice constrain a display to an effective bit depth equal to that of the image, notwithstanding the display's potentially higher bit depth capability. For example, one approach to displaying an image encoded with a bit depth of 8 bits on a display having a bit depth of 10 bits is to use the 8-bit image data as the most-significant 8 bits of a 10-bit drive signal for the display. This has the advantage of using almost the full luminance range of the display. However, the resulting image may have banding or other undesirable visually perceptible artifacts because the full bit depth of the display is not utilized and so steps between adjacent luminance levels may be visible. Such artifacts can be particularly noticeable where the luminance range is large as, for example, in the case where the display is a high-brightness, high dynamic range display. Using the 8-bit depth image data as the least significant bits of the 10-bit drive signal for the display is also undesirable as the luminance range capability of the display is not fully or adequately utilized.

FIG. 2 depicts a high definition television (HDTV) 30 and a high definition computer monitor 32 connected to a computer 31. Computer 31 and HDTV 30 are both connected to receive image data over various distribution media paths. HDTV 30 and computer monitor 32 are each capable of displaying image data having a bit depth of n bits. In each case, even if the image data originally had a larger bit depth, the image data is distributed in a lower bit-depth format (e.g. m-bits). In this example, image data 20 initially has a bit depth of n-bits or greater (n+-bits) and each distribution path includes at least one section in which the image data is carried in a format having a bit depth of m bits with m<n. m is not necessarily the same for all distribution paths. Illustrated in FIG. 2 are an internet distribution path 21, a disc (e.g. a DVD or a Blu-ray™ disc) distribution path 22, a cable TV distribution path 23, and a satellite TV distribution path 24.

Image data 20 is obtained from a suitable source such as a camera 25. Internet distribution path 21 carries image data 20 in an m-bit depth format across the internet. Disc distribution path 22 records image data 20 in an m-bit depth format on a disc 26 that is played back on a disc player 27. Cable television distribution path 23 carries image data 20 in an m-bit depth format across a cable television system network 28 to a cable TV set-top box 29 which distributes lower bit depth (i.e. m-bit, where m<n) encoded versions of image data 20 to an n-bit backlit high dynamic range image display such as high definition television (HDTV) 30, or high definition computer monitor 32. Satellite TV distribution path 24 includes a satellite transmitter 33 which distributes an m-bit encoded versions of image data 20 to a satellite receiver 34. It will be understood that imaging system variants having fewer or more image sources, fewer or more image processors, and fewer or more displays are possible.

Some backlit displays have a "global dimming" capability whereby all of the lighting elements in the display's backlight can be simultaneously dimmed or turned off. Global dimming can improve a display's luminance range in comparison to an equivalent display having no dimming capability.

Some other backlit displays have a "local dimming" capability whereby individual lighting elements or groups of lighting elements in the display's backlight can be selectively dimmed or turned off. Local dimming can significantly improve a display's dynamic range in comparison to an equivalent display having no dimming capability, or improve a display's local contrast and simultaneous range in comparison to an equivalent display having a global dimming capability.

FIG. 3 schematically depicts display of bright and dark images respectively on a dimmable display, using a log(L) graphical representation, where L represents luminance in nits. High dynamic range image data may, for example, specify luminance values ranging from 0.001 to 10,000 nits, corresponding to bar 41 in FIG. 3. A display may be capable of displaying images having luminance values ranging from 0.1 to 600 nits, for example, corresponding to bar 42 indicated in FIG. 3. If the display has a dimming capability then the same display may also be capable of displaying dark images having luminance values ranging from 0.01 to 60 nits, when the display's dimming capability is fully utilized—corresponding to bar 43 indicated in FIG. 3.

FIG. 3 includes a histogram for one scene "Scene A" that may be displayed on the display. Scene A corresponds to a high dynamic range image of a bright scene characterized by luminance values ranging from 0.005 to 10,000 nits. The display's dimming capability is not used in order to minimize reduction of the image's brighter characteristics when the Scene A image is displayed. Pixels of Scene A for which the specified brightness exceeds 600 nits may be clipped to 600 nits or otherwise processed (e.g., scaled, tone-mapped, etc.) for display within the range indicated by bar 42. Similarly, pixels of Scene A for which the specified brightness is less than 0.1 nits may be clipped to 0.1 nits or otherwise processed (e.g., scaled, tone-mapped, etc.) for display within the range indicated by bar 42.

FIG. 3 also includes a histogram for another scene "Scene B" that corresponds to a high dynamic range image of a dark scene characterized by luminance values ranging from 0.001 to 200 nits. The display's dimming capability may be utilized to improve retention of the image's luminance characteristics within an intermediate luminance range indicated by bar 44 when the Scene B image is displayed. Any pixels of Scene B for which the specified brightness exceeds 200 nits may be clipped to 200 nits or otherwise processed (e.g., scaled, tone-mapped, etc.) for display within the range indicated by bar 44. Similarly, pixels of Scene B for which the specified brightness is less than about 0.03 nits may be clipped to 0.03 nits or otherwise processed (e.g., scaled, tone-mapped, etc.) for display within the range indicated by bar 44.

Content Metadata Image Enhancement

Figure 4:
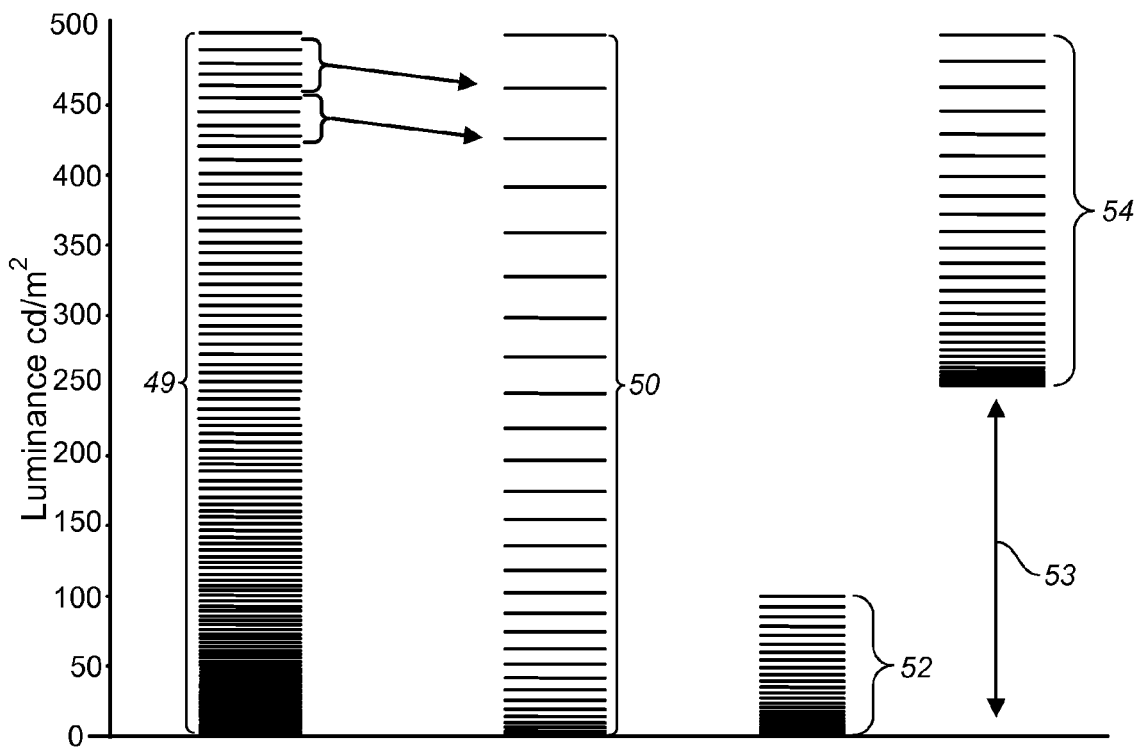
FIG. 4 schematically illustrates re-mapping a luminance range of image data.

Embodiments of this invention redefine the mapping between image data values and corresponding luminance values. The redefinition may, for example scale and/or apply offsets to this mapping. This approach may be applied to obtain better quality images when image data is distributed in a lower bit-depth format. In some embodiments the redefined mapping may be specified by metadata that is associated with the image data. The metadata may be encoded in the image data, delivered with the image data or delivered separately from the image data. In some embodiments, the redefined mapping is implemented at a display at least in part through control of global or local dimming FIG. 4 provides an exaggerated illustration of how remapping of image data values to luminance levels can be used to improve image quality. Specifically, the set of lines 49 illustrates a possible mapping of 128 image data values (a bit-depth of 7) to luminance values over a 500 nit luminance range. Lines 50 in FIG. 4 graphically depict a possible mapping of 32 image data values (a bit-depth of 5) to luminance values over the same 500 nit luminance range. In each case a gamma of 2.4 has been used to distribute the steps, as is common. The image data values for lines 49 may, for example, be provided by a 7-bit binary number (bit depth of 7). The image data values for lines 50 may, for example, be provided by a 5-bit binary number (bit depth of 5). It can be seen that the steps between adjacent luminance values in lines 50 are significantly larger than the steps between adjacent luminance values in lines 49. Such large steps may be perceptible to the HVS and may result in visible artifacts, such as banding, in an image.

Encoding image data originally in a higher-bit depth format (as exemplified by lines 49) into a lower bit-depth format (as exemplified by lines 50) results in multiple discrete luminance values from the higher-bit depth image data being encoded as the same luminance value in the lower bit-depth image data and in the steps between adjacent, distinctly representable, luminance values being increased.

In many images, image data values are concentrated toward higher- or lower luminance and are not spread uniformly over the entire range of possible image data values. For example, a dark image may have no or few image values above some threshold value and a bright image may have no or few image values below some threshold value. For such images, altering the mapping between image data values and luminance values can allow smaller steps between adjacent luminance values without increasing the bit depth used to represent the image data values.

Consider the case of a dark image represented in higher-bit depth image data 49 in which no pixels have luminance values of over 100 nits. Mapping that image data to lower bit-depth image data 50 could result in significant loss of detail since lower bit-depth image data 50 can represent only ¼ as many discrete brightness levels in the range of 0 to 100 nits as higher bit-depth image data 49.

In FIG. 4, the set of lines 52 illustrate luminance values in a case where the same lower bit-depth image data values corresponding to lines 50 have been re-mapped to correspond to luminance values in the range of 0 to 100 nits. In this case, the remapping comprises scaling by a factor that is less than 1 (a factor of 0.2 in the illustrated example). It can be seen that the steps between adjacent luminance values are reduced as compared to the steps between lines 50. Mapping higher-bit depth image data 49 in the range of 0 to 100 nits to lower bit-depth data using the mapping exemplified by lines 52 can preserve detail that would have been lost if one used a conventional mapping like that of lines 50.

In FIG. 4, the set of lines 54 illustrate luminance values in a case where the same image data values corresponding to lines 50 have been re-mapped to luminance values in the range of 250 to 500 nits. In this case, the remapping includes both scaling and translation by an offset 56. Again, it can be seen that the steps between adjacent luminance values are reduced as compared to the steps between lines 50. Where higher bit-depth image data 49 depicts an image consisting essentially of luminance values in the range of 250 to 500 nits then a mapping as exemplified by lines 54 may be used to preserve detail when encoding that higher bit-depth image data in a lower bit-depth form.

Remapping of image data values to luminance values (or equivalent) may be performed for an entire image or scene (group of images) or for local regions within an image or scene. If remapping is done for local regions then the local regions may be regions specified by a predetermined grid, regions identified by analysis of image data or the like.

Where an image or part of an image has been encoded into a lower bit-depth representation using a special mapping then information specifying what mapping was used may be preserved and used subsequently to convert the image data back into a higher bit-depth representation for display. The information characterizing the mapping may, for example, be associated with the lower bit-depth image data as metadata.

Figure 5:
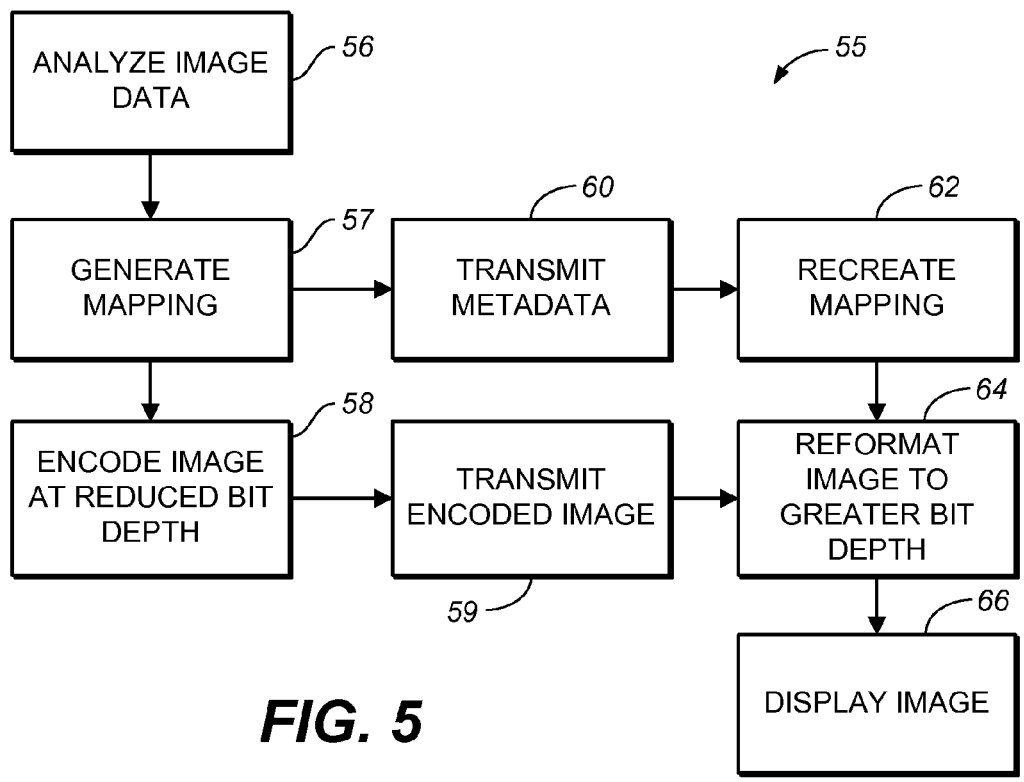
FIG. 5 is a flow chart illustrating a method according to an example embodiment of the invention.

FIG. 5 illustrates a method 55 that applies remapping as described above. Method 55 begins by analyzing an image or local region within an image in block 56. The analysis determines whether the luminance values in the image or local region fall (or mostly fall) within a limited range. If so, then block 57 generates a mapping that can be used to map luminance values to image data values in a reduced bit-depth representation of the image and vice versa. For example, if the luminance values are all in the range of 250 nits to 500 nits then the mapping may correspond to lines 54 in FIG. 4. In some embodiments, block 57 may perform clipping, compression, tone-mapping or like operations on image data to cause the luminance values to fall within a limited range. In some embodiments block 57 selects a mapping most suited to an image or local region within an image from among a number of predetermined mappings. In some embodiments, block 57 generates a custom mapping based on characteristics of the image or local region within the image.

Block 57 may generate a mapping based upon analysis of statistical information regarding the image or local region within the image. For example, block 57 may generate a mapping based upon a histogram of the image or local region within the image. The histogram may, for example, provide, for different luminance values or equivalent or different ranges of luminance values or equivalent the number of pixels corresponding to the luminance value or range or luminance values. From a histogram, one can determine whether: the image is primarily bright, primarily dark, or includes both bright and dark regions, whether the image includes a broad range of luminance values, includes a narrow range of luminance values, or the like. Such evaluation may be applied to select an appropriate mapping.

In block 58 the mapping of block 57 is applied to map luminance values (or equivalents) from image data to image data values that are encoded at a reduced bit depth. In block 59 the encoded image data is transmitted over a transmission path. In block 60 metadata that characterizes the mapping is also transmitted. Block 60 may comprise, for example, encoding the metadata in the image data itself, encoding the metadata as part of a data package that includes the image data, transmitting the metadata together with the image data or transmitting the metadata on a separate transmission path from the image data.

The metadata may specify a predetermined mapping and/or may provide parameters for a mapping (the parameters may, for example directly or indirectly specify an offset and/or a scaling factor and/or parameters of a linear or non-linear mapping function). In some embodiments, different mapping functions may be selected for images having different characteristics. For example the mapping used for images made up primarily of very bright highlights may have a different functional form than the mapping function used for images made up primarily of dark shadows.

In block 62 the metadata is applied to recreate the mapping and in block 64 the recreated mapping is applied to reformat the image data to a greater bit depth. In block 66 the reformatted image data is displayed. In method 55, blocks 56 to 58 may be performed, for example, at a source of image data, blocks 62 and 64 may be performed at a display or at a device on a transmission path (such as a set top box or a transcoder, for example) upstream from a display.

It can be appreciated that application of method 55 to a series of images or local regions within an image can result in the same luminance values being encoded as different image data values for different ones of the images and/or for different local regions in the reduced bit-depth encoded image data. Application of method 55 to a series of images or local regions within an image may result in different luminance values being encoded as the same image data values for different ones of the images and/or for different local regions in the reduced bit-depth encoded image data.

Figure 6:
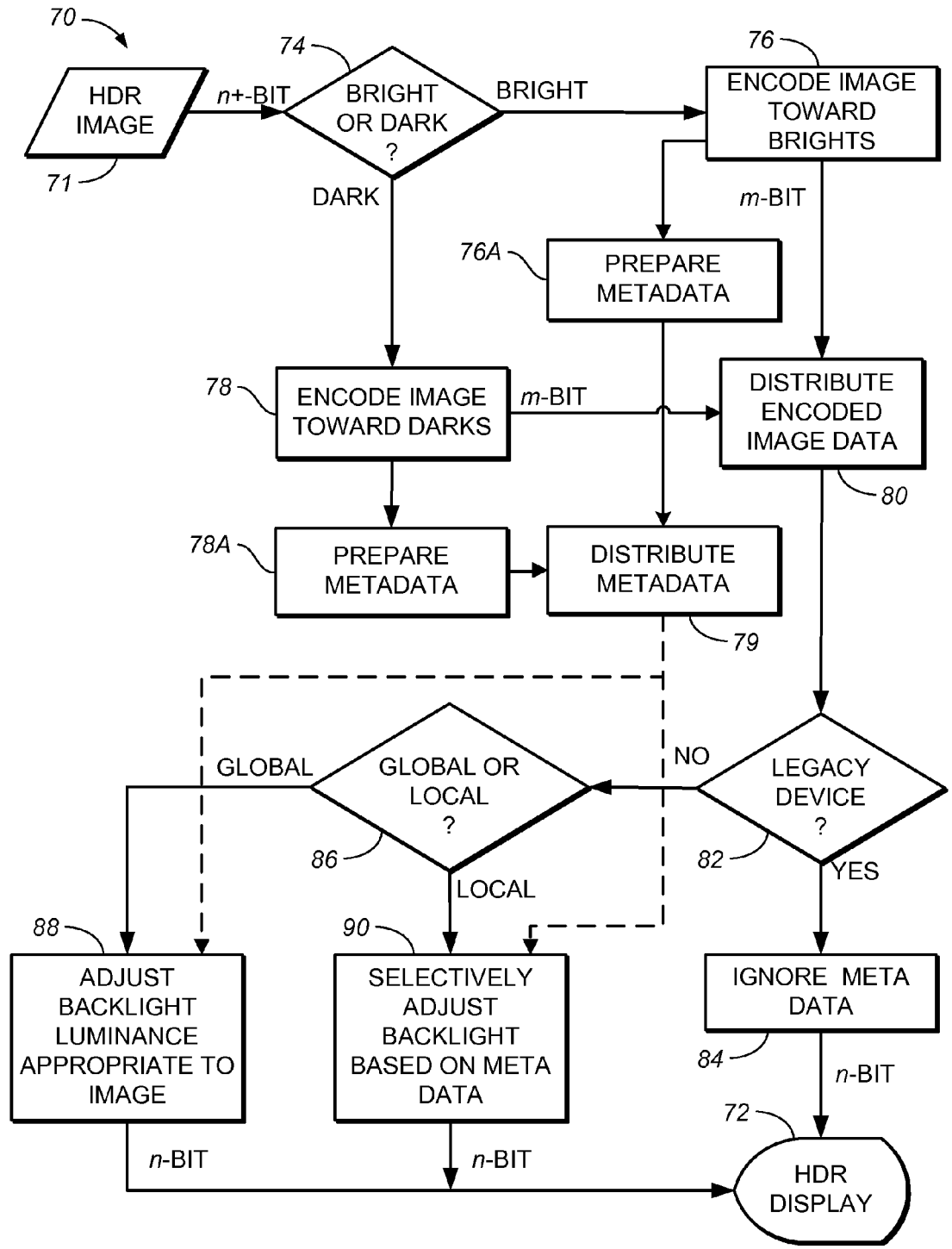
FIG. 6 is a simplified flowchart illustrating a method according to another embodiment of the invention.

FIG. 6 illustrates another example method 70 which can exploit dimming displays. In method 70, metadata characterizing the luminance range of a high dynamic range image 71 can be distributed, with an m-bit encoded version of the image, to a high dynamic range display 72 which may be a non-dimming display, a global dimming display or a local dimming display. Display 72 has an n-bit depth capability, where m<n. Image 71 may be obtained from any one of a variety of image sources, and display 72 may be any one of a variety of display types.

The luminance characteristic of image 71 is analyzed (FIG. 6, block 74) by a processor external to display 72. The processor may comprise any one of a variety of image processors. If the block 74 analysis determines that image 71 is relatively bright (block 74 "bright" branch) then image 71 is m-bit encoded (block 76) utilizing a mapping in which the brightness of each pixel is mapped to one of $2^m$ image data levels with a mapping such that the luminance values corresponding to the image data levels span image 71's luminance range (which, because image 71 has no or only a few dark pixels, is smaller than the maximum luminance range that image 71 could have).

If the block 74 analysis determines that image 71 is relatively dark (block 74 "dark" branch) then image 71 is m-bit encoded (block 78) utilizing a mapping in which the brightness of each pixel is mapped to one of $2^m$ image data levels with a mapping such that the luminance values corresponding to the image data levels span image 71's relatively dark luminance range (which, because image 71 has no or only a few bright pixels, is also smaller than the maximum luminance range that image 71 could have). In general, image 71 is m-bit encoded utilizing a mapping in which the luminance or equivalent for each pixel is mapped to one of $2^m$ image data values such that the luminance values corresponding to the image data values span image 71's luminance range. In some embodiments the luminance range of image 71 (or a region within image 71) excludes luminance values for outlying pixels. For example, the luminance range on which the mapping is based may not encompass luminance values below the $X^{th}$ percentile for brightness and above the $Y^{th}$ percentile for brightness. In some embodiments, the image analysis of block 74 may be configured such that a standard mapping is applied in the event that block 74 determines that the image is neither bright nor dark.

Metadata characterizing the mapping of block 76 (or from which the mapping can be inferred) is generated in block 76A. Metadata characterizing the mapping of block 78 (or from which the mapping can be inferred) is generated in block 78A. In either case the metadata may, for example, characterize the luminance range of the image data being encoded in the corresponding block 76 or 78.

In block 80 the m-bit encoded image data is distributed. In block 79 the metadata is distributed. In some embodiments block 79 comprises embedding the metadata into the encoded image data so that distributing the encoded image data also distributes the metadata. Alternatively, the metadata may be distributed in another manner In some embodiments the encoded image data and metadata are distributed via one or more distribution channels like those described above in relation to FIG. 2.

In some embodiments, image data 71 has previously been analyzed (upstream from blocks 76 and 78) and includes or is associated with metadata which directly or indirectly characterizes: the luminance ranges of images or regions within images represented in image data 71 or mappings to be applied to those images or regions within images. In such embodiments, blocks 76 and 78 may comprise extracting or accessing the previously-determined metadata and encoding the image data according to mappings based on that metadata. In some embodiments, block 74 characterizes the luminance characteristics of a current image or region within an image and the functions of blocks 76 and 78 are combined in a block which encodes the image data for the current image or region using a suitable mapping based upon the determination made in block 74.

Upon receipt of the m-bit encoded version of image 71 at a display or other device, method 70 proceeds differently depending upon whether the device is a legacy device which is not configured to process the metadata (block 82 "YES" branch) or a display that can process the metadata (block 82 "NO" branch).

For a legacy device the m-bit encoded version of image 71 is decoded but the metadata is ignored (block 84). The decoded image is accordingly displayed without regard to the metadata, thus maintaining compatibility with legacy displays. If the device is equipped to process the metadata (block 82 "NO" branch) then the metadata is used to improve display of images in the encoded image data. In this example, the improved image quality is obtained by using metadata to control a dimming capability of display 72. This is only one of a variety of ways to implement the invention. For example, metadata associated with the m-bit encoded version of image 71 may be applied to recreate the mapping utilized to m-bit encode image 71 and the recreated mapping may be applied to decode the image data to n-bit depth. The invention is not limited to displays having dimming backlights or to the use of metadata to control backlight dimming in such displays.

In method 70 where the display 72 is a global dimming display (block 82 "YES" branch and block 86 "GLOBAL" branch) then the m-bit encoded version of image 71 is decoded and the associated metadata (which may, for example, be derived or extracted from the encoded image data) is processed to determine the image's luminance characteristic. Display 72's backlight is then adjusted (block 88) in accordance with the metadata to best achieve the image's luminance characteristic, so that the m-bit encoded version of image 71 is mapped correctly to output light levels based on the metadata.

If display 72 is a local dimming display (block 82 "NO" branch and block 86 "LOCAL" branch) then the m-bit encoded version of image 71 is decoded and the metadata associated with image 71 is processed to determine the image's local luminance characteristics. Display 72's individual backlight elements are then selectively adjusted (block 90) in accordance with the metadata to best achieve the image's luminance characteristic.

In some embodiments, decoding of m-bit encoded image 71 and backlight adjustment are interdependent. For example, m-bit encoded image data 71 may be decoded and the display's backlight may be adjusted such that the combined re-mapping and backlight adjustment recreates or approximates the mapping utilized to m-bit encode image data 71 in step 76 or 78. For instance, where a mapping utilized in step 76 or step 78 comprises a scaling and a translation by an offset, m-bit encoded image 71 may be decoded to apply the scaling and the brightness of the display's backlight may be adjusted to apply the offset. In method 70, for both global dimming displays and local dimming displays, image quality is improved because the initial mapping to the m-bit encoded image data is altered to take into account global or local luminance characteristics such that steps between adjacent luminance levels are reduced, thereby reducing or eliminating perceptible artefacts resulting from larger steps between luminance levels.

Figure 7:
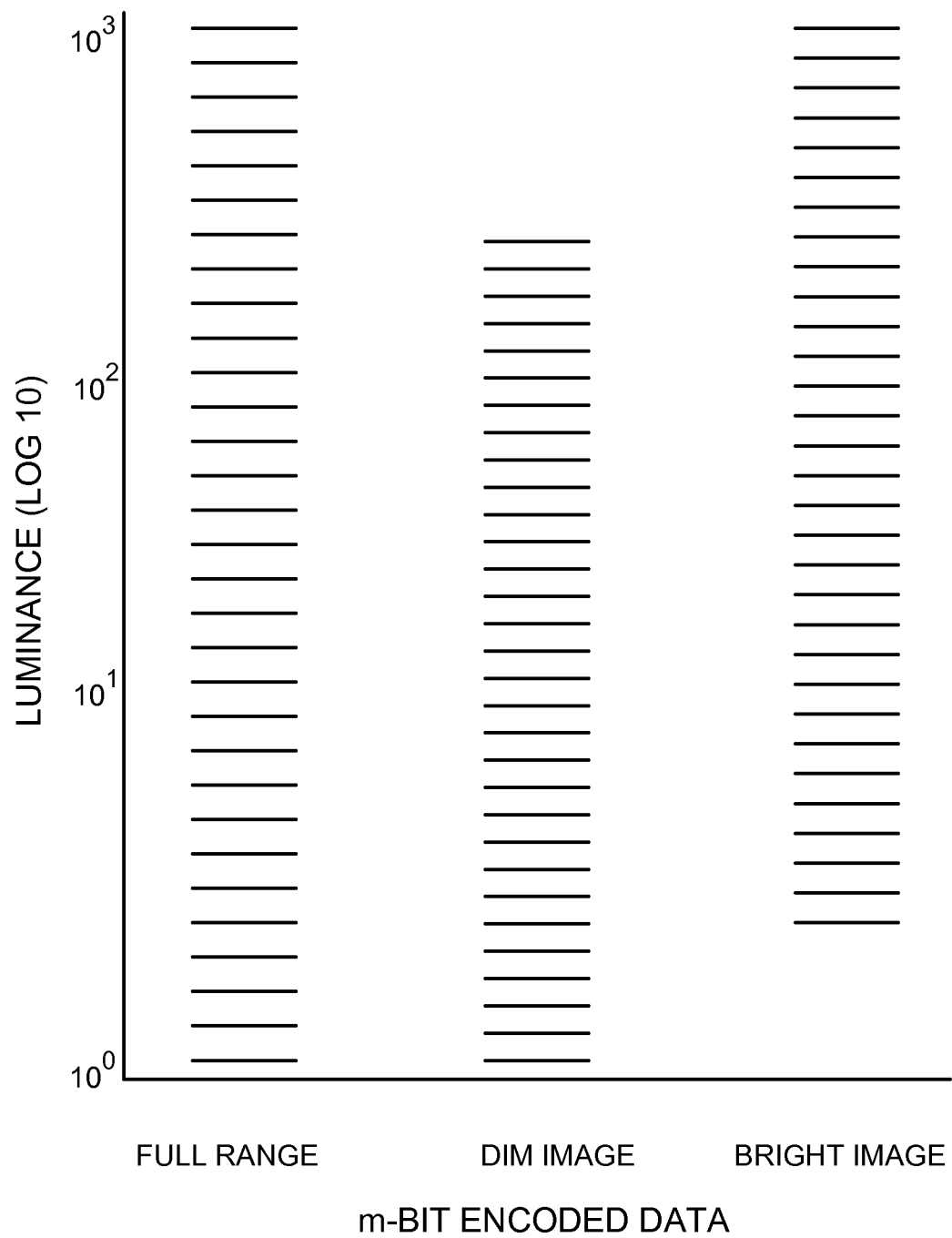
FIG. 7 graphically depicts shifting and rescaling luminance steps while encoding image data to obtain improved image quality from image data presented in a format having limited bit-depth. In the illustrated example embodiment the bit depth is 5 bits.

FIG. 7 is similar to FIG. 4 but less exaggerated. FIG. 7 shows how levels of m-bit encoded data may be mapped to different luminance levels for a bright image, a dim image, and an image that includes a full range of luminance values.

In embodiments where different mappings are applied to local regions within an image additional processing may be performed to avoid perceptible boundaries between different local regions (whether defined according to a predetermined grid or otherwise). The additional processing may comprise, for example, one or more of:
  spatial filtering;
  dithering in the vicinity of region boundaries (e.g. in a vicinity of a region boundary randomly or quasi-randomly applying mappings from different adjacent regions to pixels);
  blending between adjacent mappings (e.g. in the vicinity of a region boundary computing pixel values for a plurality of mappings associated with adjacent regions and interpolating between the mappings so as to provide a smooth transition from one mapping to another across the boundary region). In some embodiments the blending may be performed according to spline curves. The spline curves may be predefined or defined by metadata.

Figure 8:
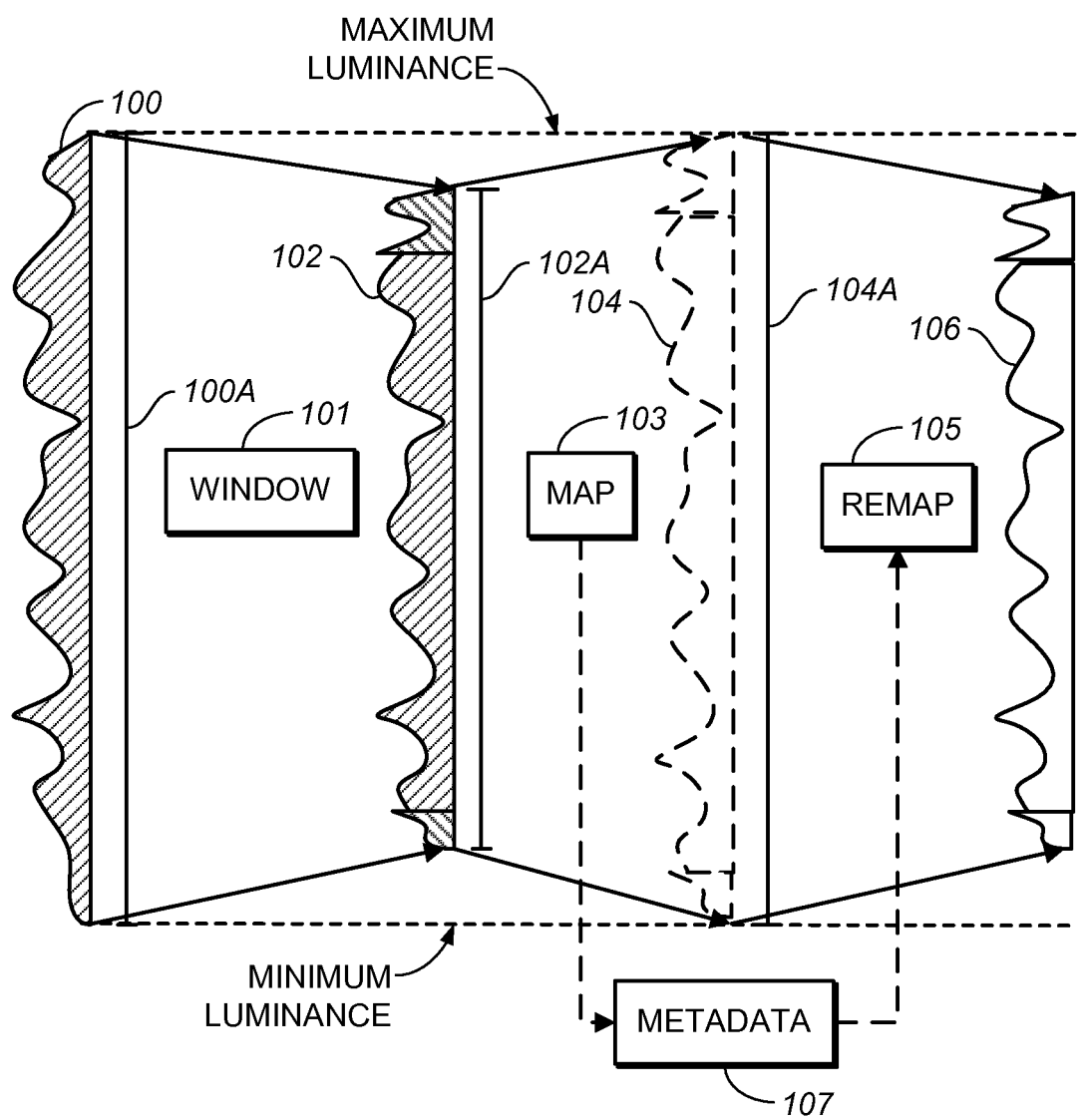
FIG. 8 schematically depicts distributing image data by way of a m-bit depth encoded image for display on a display capable of a bit depth of n-bits according to an embodiment of the invention.

FIG. 8 schematically depicts another example embodiment of the invention. Original image data 100 is represented in FIG. 8 by a histogram. Original image data 100 is in a format providing a higher bit depth. For example, image data 100 may comprise data in a 16-bit integer or 16-bit float data format. Such formats permit a pixel to be assigned any one of a very large number of discrete luminance values within a full luminance range. Thus, steps between adjacent luminance values in image data 100 can be small. The maximum and minimum luminance values of original image data 100 span the maximum range 100A of luminance values that can be represented by the data format.

Original image data 100 is windowed as indicated by 101 to provide windowed image data 102. Windowed image data 102 comprises luminance values within a reduced luminance range 102A that is smaller than the full luminance range 100A that can be represented by the format of image data 100. Windowing 101 may comprise clipping luminance values to endpoints of reduced luminance range 102A, compressing luminance values that are outside of reduced luminance range 102A into reduced luminance range 102A, tone-mapping luminance values that are outside of reduced luminance range 102A into reduced luminance range 102A, a combination of these, or the like. In some embodiments, windowing 101 comprises tone compression, such that within a particular luminance range, windowed image data 102 comprises fewer different luminance values than original image data 100. Reduced luminance range 102A and the windowing operations by which windowed image data 102 is obtained from image data 100 may be selected to preserve details in original image data 100. Windowed image data 102 may still be represented in a format having a relatively high bit depth (which may be the same format as that of original image data 100).

As indicated by 103 windowed image data 102 is mapped onto values in a reduced bit-depth format to yield reduced bit-depth image data 104. The mapping applied by 103 is such that the reduced luminance range 102A of windowed image data 102 is mapped to a greater proportion of the range 104A that can be represented by the reduced bit-depth format (i.e., the maximum range of the lower bit-depth representation) than would be the case if the full luminance range 100A of image data 100 had been mapped to range 104A. In some embodiments the mapping of reduced luminance range 102A is to the full extent of range 104A (or almost the full extent of range 104A, for example, more than 85% or 90% or 95% or 98% of range 104A). Thus all or almost all of the distinct values that can be represented by the reduced bit-depth format are used to represent values between the lower and upper ends of reduced luminance range 102A of windowed luminance data 102. Mapping 103 may comprise mapping n+-bit depth image data to m-bit image data with m<n.

Metadata 107 characterizes the mapping used in mapping 103, and, optionally, the windowing performed at 101, such that a downstream process can use metadata 107 to determine how to reverse the mapping performed at 103, and, optionally, part or all of the windowing performed at 101.

Reduced bit-depth data 104 may be distributed by any suitable transport mechanism. The lower precision of reduced bit-depth data 104 results in reduced bit-depth data 104 being smaller and more compressible than original image data 100. Metadata 107 is distributed with reduced bit-depth data 104. Reduced bit depth data 104 is distributed to a display or an intermediate device at which it is desired to convert reduced bit depth data 104 back into a higher bit-depth format for display.

At the display or other device, reduced bit depth data is re-mapped as indicated by 105 to provide reconstructed data 106. Reconstructed data 106 has a greater bit depth than reduced bit-depth data 104. Metadata 107 is used by remapping step 105 to determine how the remapping ought to be carried out to most closely recreate windowed data 102. Reconstructed data 106 can then be displayed.

In some embodiments, mapping 103 comprises mapping the top end of windowed image data 102 to the top end of reduced bit-depth image data 104 and the bottom end of windowed image data 102 to the lower end of reduced bit-depth data 104 and mapping intermediate values of windowed image data 102 to corresponding intermediate values of reduced bit-depth image data 104 according to a mapping that is uniform linearly or logarithmically. In other embodiments intermediate values are mapped according to a non-uniform mapping such that discrete levels of the reduced bit-depth image data 104 are separated by smaller luminance steps in luminance ranges having a lot of tone detail and separated by correspondingly larger luminance steps in luminance ranges in which there is not a lot of tone detail as compared to a uniform mapping. The amount of tone detail present in any particular luminance sub-range within luminance range 102A of windowed image data 102 may, for example, be estimated from an image histogram as an increasing function of the number of pixels in the luminance sub-range and the number of discrete luminance values those pixels have in the luminance sub-range. Thus, portions of the luminance range of windowed image data 102 in which there are few pixels and few distinct luminance values could be mapped to reduced bit-depth data 104 such that there are relatively large steps between adjacent luminance values and portions of the luminance range of windowed image data 102 in which there are many pixels and many distinct luminance values could be mapped to reduced bit-depth data 104 such that there are relatively small steps between adjacent luminance values.

For example, the correspondence between image data values and luminances in original image data 100 and windowed image data 102 may be a linear or logarithmic relationship. By contrast, the correspondence between image data values and luminances in reduced bit-depth image data 104 may follow a nonlinear function such as a double s curve or a curve approximated by a polynomial.

As an example, a high bit depth high dynamic range image may be provided as a 10-bit log-encoded signal having an expected response range of 0.001 to 600 nits. The display may have a global or a locally dimmable backlight, and an 8-bit liquid crystal display (LCD) panel having a 700:1 contrast ratio and a peak brightness capability of 500 nits. The luminance metadata characterizing one or more selected luminance characteristics of the image is derived as explained above. For example, the distribution of luminance values in the image can be used to derive an optimal tone curve corresponding to an 8-bit mapped version of the image. The optimal tone curve may take into account the capabilities of the display so as to maintain the most detail in the image. The metadata, e.g. the tone curve and black level are then sent to the display along with the image data. Knowing the image's luminance range from the metadata the display can map the image data into the appropriate luminance range at the higher native bit-depth of the display.

In some embodiments for at least some images, the lower bit-depth encoded data received by a display (or other intermediate image processing device) is directly mapped to bits of the higher bit-depth drive for the display. For example, in some cases, 8-bit lower-bit depth data may be mapped directly to the most significant bits of 10-bit image data for driving the display.

In contrast, a conventional prior art imaging system would typically use a predefined, invariant, mapping scheme to map the 10-bit log-encoded signal to produce an 8-bit power/gamma encoded version of the image, which would then be displayed using fixed brightness and response. As all of the mappings are fixed, dark scenes that are clear and detailed in the original image data input would be limited to fewer bits and more brightness on the bottom end.

Figure 9:
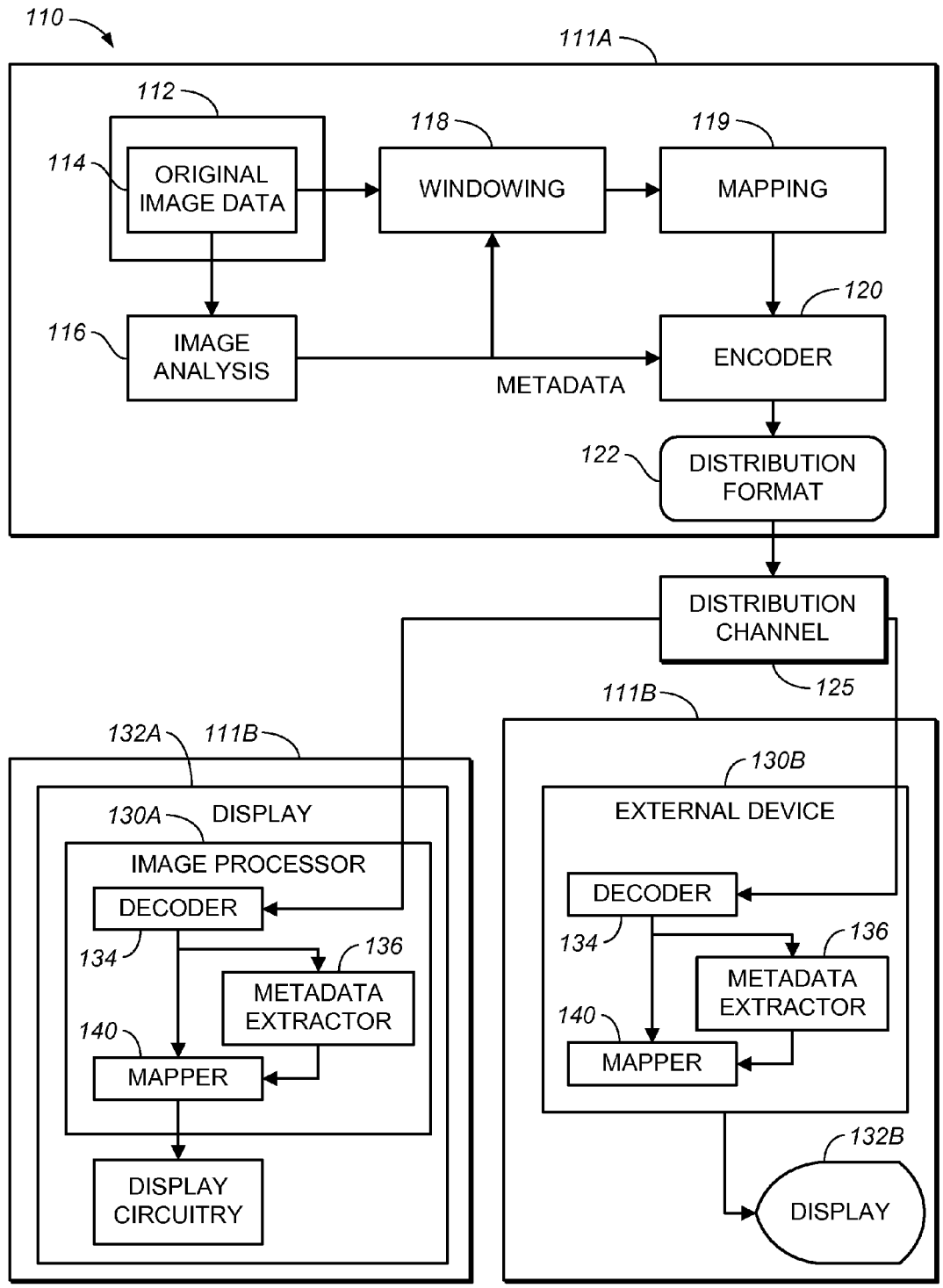
FIG. 9 schematically depicts apparatus according to an example embodiment of the invention.

FIG. 9 schematically illustrates apparatus 110 according to an example embodiment of the invention. Apparatus 110 comprises an image data preparation part 111A and an image data restoration part 111B. Image data preparation part 111A does not necessarily operate in real time (i.e. fast enough to process video frames at the display rate of the video frames) although it may do so. Image data preparation part 111A prepares the image data for distribution and image data restoration part 111B restores image data for display.

Image data preparation part comprises a data store 112 containing original image data 114. Original image data 114 may comprise still or video images. In the following discussion it is assumed that original image data 114 comprises video data and the video data comprises a series of video frames. Apparatus 110 comprises an image analysis module 116. Image analysis module 116 determines a luminance range of a frame (or, in some embodiments, of a series of frames, or of a local region within a frame or series of frames). Optionally image analysis module 116 also evaluates whether conditions exist such that the frame may be windowed to have a smaller luminance range without undesirable degradation in image quality and, if so, the degree and/or type of windowing to be applied. In some embodiments image analysis module 116 generates or obtains a histogram for the frame and performs analysis on the histogram. The histogram may, for example, plot the number of pixels in an image having each pixel value.

In the illustrated embodiment, apparatus 110 comprises a windowing module 118 that performs windowing on each frame in response to a control signal from image analysis module 116. A mapping unit 119 maps the windowed frames from windowing module 118 to a lower bit depth using a mapping based upon the luminance range of each windowed frame. The mapping can vary from frame-to-frame. In some embodiments mapping unit 119 provides a plurality of predetermined mappings. For example, mapping unit 119 may comprise a plurality of lookup tables that accept a luminance value (or equivalent) from the windowed frame as input and output a corresponding mapped value. Each lookup table may correspond to a different mapping. As another example, different mappings may be specified by different parameter values used by a processor (a plurality of sets of predetermined processor values may optionally be provided). As another example, different mappings may be provided by different logic pathways and/or by different software modules.

An encoder 120 encodes the lower bit depth image data together with metadata in a distribution format 122. Metadata may be encoded into standard metadata paths such as supplemental enhancement information (SEI) messages, broadcast teletext, or the like. The image data in distribution format 122 may then be distributed, for example, by writing it to a disc or other distribution medium, broadcasting on a cable television or other broadcast medium, file transfer, streaming data transfer or the like. The distribution channel is indicated by 125 in FIG. 9. FIG. 9 illustrates two architectures. In one case, the distributed image data is processed by a processor 130A internal to a display 132A. In another case, the distributed image data is processed by an external processor 130B external to a display 132B.

Displays 132A and 132B each have a bit depth greater than that of the distributed image data. Processors 130A and 130B each comprise a decoder 134 that decodes the distributed image data and a metadata extractor 136 that extracts the metadata from the distributed image data. A mapper 140 maps the distributed image data to the bit depth of the display according to a mapping set according to the metadata. The mapper may, for example, comprise a set of lookup tables or logic paths that implement different predetermined mappings, a logic path that implements mappings according to supplied parameter values or control inputs, a processor that implements a mapping algorithm that performs mappings according to supplied parameter values or control inputs, a processor that executes one of a plurality of predetermined mapping algorithms, or the like.

Conclusion

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor. Furthermore, aspects of the system can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Image processing and processing steps as described above may be performed in hardware, software or suitable combinations of hardware and software. For example, such image processing may be performed by a data processor (such as one or more microprocessors, graphics processors, digital signal processors or the like) executing software and/or firmware instructions which cause the data processor to implement methods as described herein. Such methods may also be performed by logic circuits which may be hard configured or configurable (such as, for example logic circuits provided by a field-programmable gate array "FPGA").

Certain implementations of the invention comprise computer processors which execute software instructions which cause the processors to perform a method of the invention. For example, one or more processors in a video workstation, set top box, display, transcoder or the like may implement methods as described herein by executing software instructions in a program memory accessible to the processors.

The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various examples described above can be combined to provide further examples. Aspects of the system can be modified, if necessary, to employ the systems, functions, and concepts of the various references described above to provide yet further examples of the technology.

These and other changes can be made to the system in light of the above Detailed Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the technology under the claims.

From the foregoing, it will be appreciated that specific examples of systems and methods have been described herein for purposes of illustration, but that various modifications may be made without deviating from the spirit and scope of the invention. Those skilled in the art will appreciate that certain features of embodiments described herein may be used in combination with features of other embodiments described herein, and that embodiments described herein may be practised or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations, modifications, additions and permutations are possible in the practice of this invention without departing from the spirit or scope thereof. The embodiments described herein are only examples. Other example embodiments may be obtained, without limitation, by combining features of the disclosed embodiments. It is therefore intended that the following appended claims and claims hereafter introduced are interpreted to include all such alterations, modifications, permutations, additions, combinations and sub-combinations as are within their true spirit and scope.

What is claimed is:

1. A method for distributing image data, the method comprising:
   determining a range of the image data;
   mapping the image data to a reduced bit-depth format to produce a lower bit-depth representation of the image data with a mapping such that a ratio of a range of the lower bit depth representation to a maximum range of the lower bit depth representation is greater than a ratio of the range of the image data to a maximum range of the image data;
   generating metadata characterizing the mapping;
   associating the metadata with the lower bit depth representation; and
   identifying a portion of the range of the image data containing greater tone detail and generating the mapping such that the identified portion maps to a portion of the lower bit depth representation that occupies a larger proportion of the maximum range of the lower bit depth representation than the proportion of the range of the image data occupied by the identified portion.

2. A method according to claim 1 wherein associating the metadata with the lower bit depth representation comprises encoding the metadata and the lower bit depth representation to provide a distribution format comprising both the metadata and the lower bit depth representation.

3. A method according to claim 1 comprising performing a tone compression prior to
   mapping the image data.

4. A method according to claim 1 comprising repeating the method for a plurality of
   frames of a video wherein the mapping is different for different ones of the frames.

5. A method according to claim 1 comprising distributing the lower bit depth representation and metadata for display.

6. A method according to claim 1 wherein distributing the metadata and lower bit depth
   representation comprises writing the metadata and lower bit depth representation onto a non-transitory distribution medium.

7. A method according to claim 1 wherein the lower bit depth representation has a bit depth of 9 or less and the image data has a bit depth of 10 or more.

8. A method for displaying images, the method comprising:
   obtaining image data in a first format having a first bit depth and corresponding metadata;

based on the metadata, generating a tone mapping for mapping the image data to a second format having a second bit depth greater than the first bit depth;

applying the tone mapping to map the image data to the second format; and displaying the second format data;

wherein the image data in a first format comprises portions of an image represented in the image data containing greater tone detail occupying a larger proportion of a range of the image data than a proportion of a range of original image data occupied by corresponding image portions in an original image from which the image data in a first format was derived.

9. Image processing apparatus comprising:

an image analyzer configured to determine a range of values in image data for an image in a first format and to generate a mapping for the image from the first format to a second format having a lower bit depth than the first format;

a mapping unit configured to map the image from the first format to the second format according to the mapping;

an encoding unit configured to encode the second format image data and metadata representing the mapping into a distribution format;

the mapping unit further configured to identify a portion of the range of the image data containing greater tone detail and generate the mapping such that the identified portion maps to a portion of the lower bit depth representation that occupies a larger proportion of the maximum range of the lower bit depth representation than the proportion of the range of the image data occupied by the identified portion.

10. Apparatus according to claim 9 wherein a ratio of a range of the lower bit depth representation to a maximum range of the lower bit depth representation is greater than a ratio of the range of the image data to a maximum range of the image data.

11. Image processing apparatus comprising:

a decoder configured to decode image data encoded at a first bit depth; and, a mapping unit configured to map the image data to a higher bit depth representation according to a variable mapping, the variable mapping set according to metadata associated with the image data;

wherein the image data encoded at a first bit depth comprises portions of an image represented in the image data containing greater tone detail occupying a larger proportion of a range of the image data than a proportion of a range of original image data occupied by corresponding image portions in an original image from which the image data was derived.

12. Apparatus according to claim 11 comprising a display connected to display images represented by the higher bit depth representation.

13. Apparatus according to claim 12 wherein the decoder is configured to extract the metadata from the image data.

14. Apparatus according to claim 11 comprising a plurality of predefined mappings wherein the apparatus is configured to select one of the predefined mappings based on the metadata.

15. Apparatus according to claim 11 comprising a plurality of lookup tables each providing a mapping between the image data and the higher bit depth representation wherein the mapping unit is configured to look up values of the higher bit depth representation in one of the lookup tables.

* * * * *